Sept. 22, 1964 K. KRÖMER ETAL 3,149,548
PHOTOGRAPHIC OBJECTIVE LENS
Filed July 17, 1961 2 Sheets-Sheet 1

INVENTORS
KARL KRÖMER
WERNER HAHN
BY Irwin S. Thompson
ATTY.

United States Patent Office 3,149,548
Patented Sept. 22, 1964

3,149,548
PHOTOGRAPHIC OBJECTIVE LENS
Karl Krömer, Radebeul, and Werner Hahn, Dresden, Germany, assignors to VEB Kamera- und Kinowerke Dresden, Dresden, Germany
Filed July 17, 1961, Ser. No. 124,607
6 Claims. (Cl. 95—45)

The present invention relates to a photographic objective lens with distance setting device, the distance setting ring of which is coupled with a setting nut mounted in the objective mount, which nut engages a threaded portion provided on the axially movable lens carrier, the lens carrier being limited in its axial movement by stops.

In known objective lenses of this kind the setting movements of the distance setting ring and of the lens carrier are dependent in motion upon one another, so that each movement of the distance setting ring necessarily results in a movement of the lens carrier and when the lens carrier encounters its stops the distance setting ring also cannot be moved further.

The aim of the invention is the design of a distance setting device wherein the distance setting ring has only a limited dependence upon the setting of the lens carrier. Such a device becomes necessary where the distance setting ring serves at the same time as setting member for exposure factors, such as diaphragm or exposure time. Here one has in mind both the common setting of distance and exposure time by reference to a subject scale and also the common setting of distance and diaphragm in the case of flash-light exposures, where despite fixed end positions of the lens carrier further values of the exposure factor settable together with the distance setting ring must be set.

In accordance with the invention, this is achieved due to the fact that between the distance setting ring and the lens carrier there is arranged a spring which, when the end position of the lens carrier defined by the stops is reached, disengages the gear connection between the distance setting ring and the lens carrier. The spring is preferably associated with the setting nut and presses this setting nut against a shoulder of the objective mount. According to a special feature of the invention the distance setting ring is coupled both with the setting ring for the exposure time and with a flashlight change-over switch, so that on selection of subjects with regard to the exposure times upon which the subjects are based the flash contact suitable for use here is switched on.

An example of embodiment is described with reference to the accompanying drawings in which.

Figure 1:
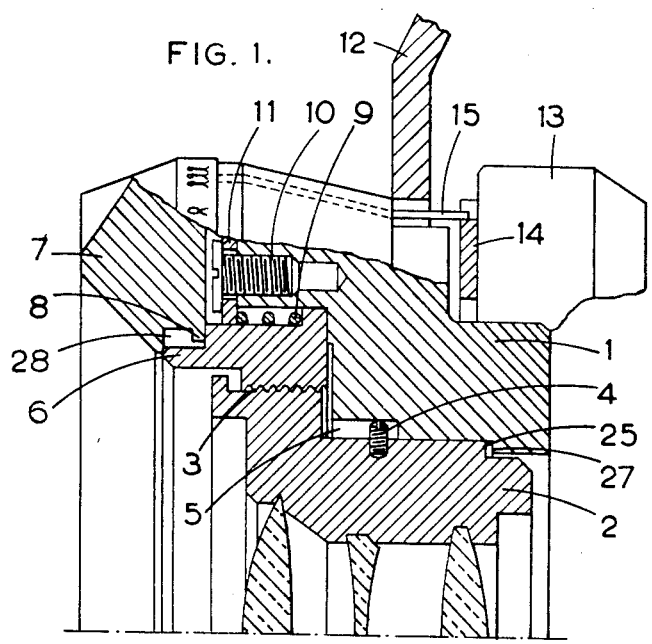
FIGURE 1 shows a section along the optical axis in the setting of the lens carrier.
Figure 2:
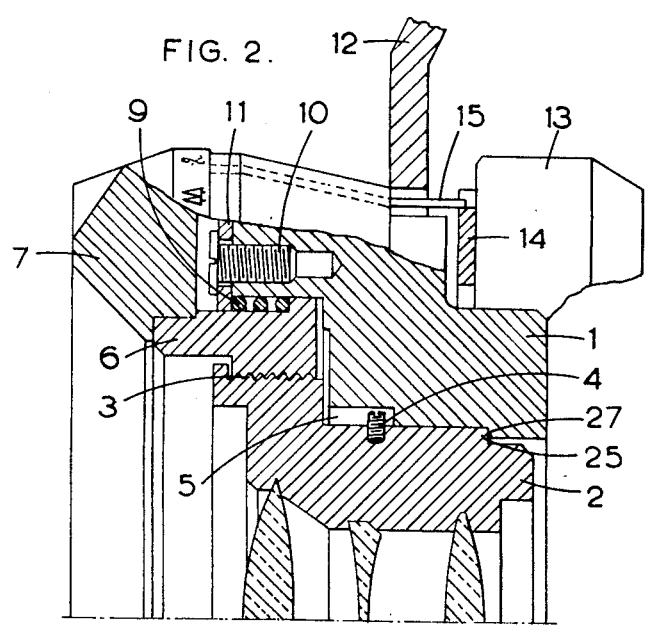
FIGURE 2 shows the same section after the end position of the lens carrier has been reached.

In the objective mount 1 (FIGURES 1 and 2), secured on the camera housing 12 there is mounted the lens carrier 2 which possesses a threaded portion 3. By means of a pin 4, which slides in a slot 5 of the objective mount 1, the lens carrier 2 is secured against rotation. A setting nut 6 engages the threaded portion 3 and is coupled with the distance setting ring 7, in that a nose 8 of the distance setting ring 7 extends into the recess 28 of the setting nut 6. A coil spring 9 presses the setting nut 6 against a shoulder of the objective mount 1, said spring 9 resting upon a securing ring 11 connected by means of a screw 10 with the objective mount 1.

In the interior of the camera housing 12 there is arranged the between-the-lens shutter 13, having a setting ring 14 for exposure time, with which ring 14 there engages an arm 15 of the distance setting ring 7. A drive lever 16 (see FIGURE 3) for the shutter blades (not shown) actuates, by way of a pin 17, a contact spring 18 which comes successively into engagement with the opposite contacts 19 and 20. Here the contact 19 first touched by the contact spring 18 serves for the lighting of flashlights with lighting delay. This contact 19 is connected through a flashlight change-over switch 21 with the connection nipple 22. The switch lever 23 actuating the flashlight change-over switch 21 is controlled by the setting ring 14.

On rotation of the distance setting ring 7, the setting ring 14 for the exposure time is also entrained by means of the arm 15, so that distance and exposure time are set commonly. The pairing of distance and exposure time corresponds to the subjects to be photographed in each case, so that the setting takes place by reference to a subject scale 24. The subjects intended for daylight exposures are contained on the component scale 24a and the subjects intended for flashlight exposures are contained together with the setting "B" on the component scale 24b.

The spring 9 urges the setting nut against the shoulder on the objective mount 1 (see FIGURE 1), so that on the rotation of the setting nut by way of the distance setting ring 7, an axial displacement of the lens carrier 2 is achieved. In the transition from the subject "landscape" (marked symbolically by two trees) to the subject "sport" (marked symbolically by a running figure) distance setting is to take place, because both subjects are based upon the same distance. However in this transition a variation of the exposure time for example from 1/80 second to 1/60 second must take place. Therefore in the setting to the subject "landscape" the lens carrier 2 strikes the stop 25 upon the stop 27 of the objective mount 1. On further rotation of the distance setting ring 7 to the subject "sport" the lens carrier 2 is blocked in its end position. On the other hand the setting nut 6 continues to rotate and instead of the lens carrier moving axially the setting nut moves axially against the action of the spring 9 and therefore moves away from the shoulder on the objective mount 1. The driving connection between the distance setting ring 7 and the lens carrier 2 is therefore disengaged (see FIGURE 2). Consequently the distance setting ring 7 on abutment of the lens carrier 2 on the objective mount 1 is not also blocked, but despite termination of the actual distance setting by axial displacement of the lens carrier 2 can be rotated further for the setting of a further exposure time.

Figure 3:
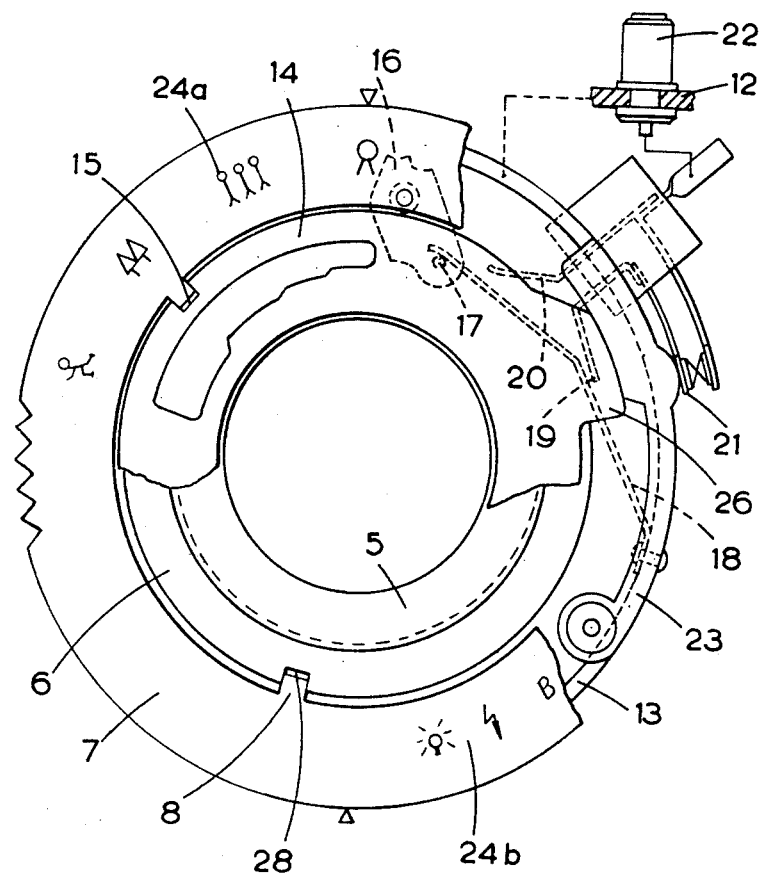
FIGURE 3 shows the control of exposure time and flashlight change-over switch by the distance setting ring.

The provided flashlight change-over switch 21 serves for the interruption of the lighting current circuit of flashlights with lighting delay (see FIGURE 3). For this purpose in the rotation of the setting ring 14 taking place as a result of the rotation of the distance setting ring 7, the cam 26 departs from the switch lever 23, so that the flashlight change-over switch 21 opens. This opening of the flashlight change-over switch 21 takes place at a position of the setting ring 14 in which the exposure time still suitable for the use of flashlights with lighting delay is left. Here in fact in the running off of the drive lever 16 moving the shutter blades the contact spring 18 will still touch the opposite contact 19, however this contacting does not result in a lighting of the connected flashlight as a result of the opening of the flashlight change-over switch 21. Only contact between the opposite contact 20 and the contact spring 18 leads to the lighting of the flashlight connection to the connection nipple 22. The indication whether the effected subject setting is suitable for flashlight with or without lighting delay takes place on the component scale 24b.

We claim:
1. In a photographic camera having a housing, an objective lens assembly axially slidable within said housing, means on said housing for limiting the axial movement of said objective lens assembly in at least one direction, means arranged between said housing and said assembly for preventing rotational movement of the latter, a threaded portion provided on said assembly, a setting nut in engagement with said threaded portion, a distance setting ring coupled with said setting nut, an exposure factor setting means carried by the housing, and means for coupling said distance setting ring with said exposure factor setting means, the provision of resilient means arranged in said housing between a fixed position on the latter and said setting nut for urging the latter towards a further fixed position on the housing.

2. In a photographic camera having a housing, an objective lens assembly axially slidable within a bore in said housing, a first shoulder on said housing for limiting the axial movement of said lens assembly in one direction, a pin provided on said assembly and being in engagement with an axial slot provided in said bore for preventing rotational movement of said assembly, a threaded portion provided on said assembly, a setting nut in engagement with said threaded portion, a distance setting ring coupled with said setting nut, a shutter device having an adjustable exposure time, carried by the housing, exposure time setting means connected with said shutter device, and an arm extending from said distance setting ring and operatively connected with said exposure time setting means, the provision of a second shoulder on said housing, and resilient means arranged around said setting nut and between a fixed position on the housing and the setting nut for urging the latter towards said second shoulder.

3. A photographic camera according to claim 2, wherein said resilient means presses the setting nut into engagement with said second shoulder when the lens assembly is out of engagement with said first shoulder.

4. A photographic camera according to claim 2 including a subject scale arranged on the housing, said distance setting ring being movable in relation thereto.

5. A photographic camera according to claim 4, wherein said subject scale is divided into component scales arranged separately from one another, of which one component scale relates to the subjects intended for daylight exposures and the other component scale relates to the subjects intended for flashlight exposures.

6. In a photographic camera having a housing, an objective lens assembly axially slidable within said housing, means on said housing for limiting the axial movement of said objective lens assembly in at least one direction, means arranged between said housing and said assembly for preventing rotational movement of the latter, a threaded portion provided on said assembly, a setting nut in engagement with said threaded portion, a distance setting ring coupled with said setting nut, a shutter device having an adjustable exposure time, carried by the housing, time exposure setting means connected with said shutter device, and means for coupling said distance setting ring with said exposure time setting means, the provision of resilient means arranged in said housing between a fixed position on the latter and said setting nut for urging the latter towards a further fixed position on the housing, a plurality of flashlight contacts for lighting flash lamps having different delay characteristics, switch means mounting in the housing, a plurality of electrical circuits connected to said contacts respectively and to said switch means, a cam provided on said exposure time setting means for actuating the switch means to select one of said circuits in accordance with the set position of the exposure time setting means, and means driven by said shutter device, to engage said contacts in turn to complete said selected circuit on operation of the camera, the other circuit being ineffective.

References Cited in the file of this patent

UNITED STATES PATENTS 2,917,983     Gebele _____ Dec. 22, 1959

FOREIGN PATENTS 895,856     Great Britain _____ May 9, 1962